H. MUDGE.
STOCK FEEDING BIN.
APPLICATION FILED APR. 19, 1921.
1,433,904.
Patented Oct. 31, 1922.
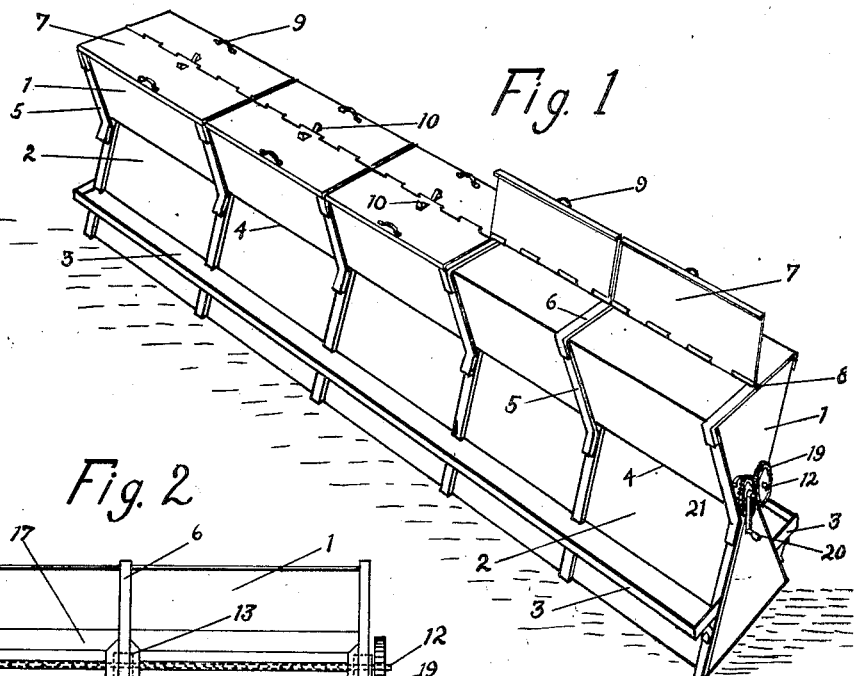
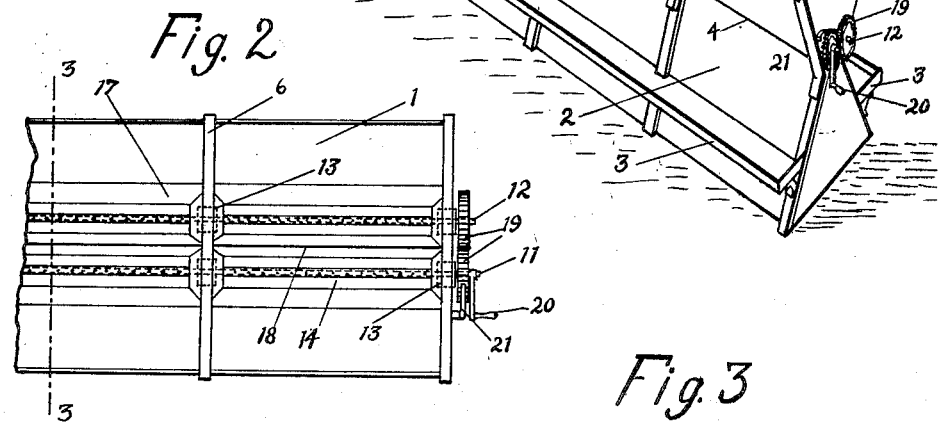
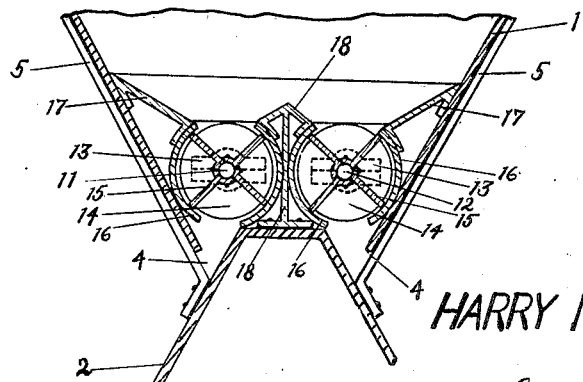
WITNESSES:
HARRY MUDGE
INVENTOR.
BY
ATTORNEY.

Patented Oct. 31, 1922.

1,433,904

UNITED STATES PATENT OFFICE.

HARRY MUDGE, OF FORT COLLINS, COLORADO, ASSIGNOR OF ONE-THIRD TO JAMES C. WILSON AND ONE-THIRD TO CLAUDE W. WOOD, BOTH OF FORT COLLINS, COLORADO.

STOCK-FEEDING BIN.

Application filed April 19, 1921. Serial No. 462,495.

*To all whom it may concern:*

Be it known that I, HARRY MUDGE, a citizen of the United States, residing at Fort Collins, in the county of Larimer and State of Colorado, have invented a new and useful Improvement in Stock-Feeding Bins, of which the following is a specification.

My invention relates to feed bins and attachments for the feeding of grain to sheep or other live stock. The object of the invention is to provide a grain feeder to be placed in feeding pens for the storage of grain or other feed and from which the feed may be mechanically and conveniently fed in measured quantities and evenly distributed throughout the length of the feeding troughs; and is adapted especially for the feeding of sheep.

I attain this object by the construction illustrated in the accompanying drawing, which forms a part of this specification.

Figure 1 in the drawing is a perspective view of a complete feed bin and troughs, showing two of the bin covers open.

Figure 2 is a top view of one end of the feeder with the covers removed.

Figure 3 is an enlarged partial cross-section through the feeding mechanism on line 3—3 of Figure 2.

Throughout the several figures of the drawing the same reference numerals indicate the same or like parts.

1 is the feed hopper supported upon and above a spreading base 2. The base 2 has closed sides and supports tight feed troughs 3 extending throughout the length of the feeder below the lower edges of the hopper 1.

The lower edges of the hopper 1 straddle the peak of base 2 forming longitudinal openings at 4 in the bottom of the hopper and at each side of the base top for the feeding of grain down into the troughs 3.

The hopper may be supported and braced in any suitable manner, as by arms 5, and tied by straps or rods 6 across the top. The feed hopper is covered by series of covers 7 hinged to a center longitudinal rod 8. The covers may be provided with convenient handles 9 and stops 10.

The feeding of grain in measured quantities from the hopper to the feed troughs is accomplished by means of revolving measures arranged at the bottom of the hopper immediately above the openings 4, as indicated in cross section in Figure 3.

11 and 12 are parallel shafts extending longitudinally through the bottom of the hopper 1 and directly above the openings at the lower edges of the hopper. These shafts are mounted in suitable bearings 13 at the ends and intermediate sections of the hopper and form the axes of the revolving measures. In each section of the hopper a drum 14 is arranged on the shafts 11 and 12, having radial wings 15, and adapted to revolve in cylinders 16 in the bottom and at the sides of the hopper. The cylinders 16 are open at their tops to receive grain from the hopper and open at the bottom to allow the grain to drop through the opening 4 into the feed troughs. Suitable flanges 17 are arranged in the hopper to direct the grain into the cylinders and also hold the cylinders in place. A longitudinal T-member 18 in the center of the hopper acts as a division board and also supports the cylinders 16.

The shafts 11 and 12 extend out at the ends of the hopper and have engaging gears 19 keyed at their ends for operation of the parallel series of rotary measures simultaneously. One shaft or gear is provided with handle 20, and a suitable dog or stop 21 is provided to hold the gears and measuring mechanism in any desired position.

The operation of the device will be apparent. The grain or other feed is placed in the hopper 1. Feeding of the grain into the troughs is accomplished merely by disengaging the dog 21 from the gear at the end of the hopper and turning the handle 20. The grain passing into the cylinders 16 is carried to the lower opening by the revolving drums and spills down the sides of the base 2 into the troughs, each quarter revolution of the handle spreading one measure of grain uniformly and quickly throughout the length of the feed troughs. When the desired amount of grain is spilled into the troughs, whether it be one measure or a quarter revolution of the handle or more, the gears are locked by means of the pivoted dog 21, or in any other desired manner, until the next feeding.

In this manner one bunch of sheep, for example, may be fed at the troughs and then driven from the pens and another bunch quickly and easily fed at the same troughs.

I claim:

In a stock feeding bin of the class described, a feed hopper supported above a spreading base, the lower edges of said hopper arranged to straddle the peak of said base forming openings in the bottom of said hopper at each side of the peak of said base, feed troughs arranged on the sides of said base to receive grain delivered through said hopper openings, rotary measuring devices arranged in the bottom of said hopper, immediately above said openings to measure and deliver feed from said hopper through said openings, said measuring devices consisting of rotary measures arranged in cylinders open at their top to receive feed from said hopper and open at their bottom to allow feed to drop therefrom, with means to rotate said measures, substantially as described.

HARRY MUDGE.

Witnesses:
JAMES C. WILSON,
CLAUDE C. COFFIN.